United States Patent
Takahashi

(10) Patent No.: US 8,229,243 B2
(45) Date of Patent: *Jul. 24, 2012

(54) SIGNAL PROCESSING APPARATUS

(75) Inventor: Fuminori Takahashi, Suwashi Nagano (JP)

(73) Assignee: Nittoh Kogaku K.K. (JP)

( * ) Notice: Subject to any disclaimer, the term of this patent is extended or adjusted under 35 U.S.C. 154(b) by 1033 days.

This patent is subject to a terminal disclaimer.

(21) Appl. No.: 11/917,966

(22) PCT Filed: Jun. 14, 2006

(86) PCT No.: PCT/JP2006/311945
§ 371 (c)(1),
(2), (4) Date: Dec. 18, 2007

(87) PCT Pub. No.: WO2006/137308
PCT Pub. Date: Dec. 28, 2006

(65) Prior Publication Data
US 2010/0021078 A1    Jan. 28, 2010

(30) Foreign Application Priority Data

Jun. 21, 2005  (JP) ................. 2005-180336
Jul. 15, 2005  (JP) ................. 2005-207105
Dec. 27, 2005  (JP) ................. 2005-374340

(51) Int. Cl.
*G06K 9/40*  (2006.01)
*H04N 5/228*  (2006.01)
(52) U.S. Cl. ............ 382/255; 382/275; 348/208.6
(58) Field of Classification Search ............. None
See application file for complete search history.

(56) References Cited

U.S. PATENT DOCUMENTS

| | | | |
|---|---|---|---|
| 4,623,237 A * | 11/1986 | Kaneda et al. ........... 396/96 |
| 5,060,007 A * | 10/1991 | Egawa ...................... 396/52 |
| 5,078,421 A * | 1/1992 | Kokubo et al. ............ 280/5.5 |
| 5,150,429 A * | 9/1992 | Miller et al. .............. 382/275 |
| 5,450,126 A * | 9/1995 | Nishida .................. 348/207.99 |
| 5,570,236 A * | 10/1996 | Hirasawa ................. 359/697 |
| 5,598,484 A * | 1/1997 | Suzuki et al. ............. 382/239 |
| 5,636,295 A * | 6/1997 | Kim ........................ 382/251 |
| 5,799,111 A * | 8/1998 | Guissin ................... 382/254 |
| 5,802,403 A * | 9/1998 | Ohishi et al. ............. 396/53 |
| 5,937,214 A * | 8/1999 | Shintani et al. ........... 396/55 |
| 6,452,183 B1 * | 9/2002 | Nambu .................. 250/363.04 |
| 6,580,062 B2 * | 6/2003 | Baer .................... 250/201.2 |
| 6,842,196 B1 * | 1/2005 | Swift et al. .............. 348/452 |
| 7,130,776 B2 * | 10/2006 | Ii et al. .................... 703/2 |

(Continued)

FOREIGN PATENT DOCUMENTS

JP    06-317824    11/1994

(Continued)

*Primary Examiner* — Michelle Entezari
(74) *Attorney, Agent, or Firm* — Cowan, Liebowitz & Latman, P.C.; Mark Montague, Esq.

(57) ABSTRACT

A signal processing device, which is more practical for restoring signals, includes a signal processing unit for processing a signal. The processing unit produces restored data that approaches the original signal data before fluctuating (before blurring) by repeating the following processing: generating comparison data Io' from arbitrary signal data Io by using information data G regarding fluctuation factors that triggers signal fluctuation; comparing the comparison data Io' with original signal data Img' as an object to be processed thereafter; producing restored data Io+n by allocating difference data δ to the arbitrary signal data Io while using the information data G regarding fluctuation factors; and substituting the restored data Io+n for the arbitrary signal data Io thereafter.

19 Claims, 10 Drawing Sheets

U.S. PATENT DOCUMENTS

| | | | |
|---|---|---|---|
| 7,415,163 B2 * | 8/2008 | Nishi et al. | 382/275 |
| 8,023,764 B2 * | 9/2011 | Miyake et al. | 382/275 |
| 2003/0026609 A1 * | 2/2003 | Parulski | 396/281 |
| 2003/0099467 A1 * | 5/2003 | Inoue et al. | 386/117 |
| 2003/0184878 A1 * | 10/2003 | Tsuzuki | 359/694 |
| 2003/0215153 A1 * | 11/2003 | Gindele et al. | 382/254 |
| 2004/0165785 A1 * | 8/2004 | Monobe et al. | 382/268 |

FOREIGN PATENT DOCUMENTS

JP  11-024122  1/1999

* cited by examiner (A)

(B)

| Pixel | n-1 | n | n+1 | n+2 | n+3 |
|---|---|---|---|---|---|
| Strength Distribution | 0.0 | 1.0 | 0.0 | 0.0 | 0.0 |

FIG. 6

RESULT OF SHOOTING AN IMAGE

| Pixel | n-3 | n-2 | n-1 | n | n+1 | n+2 | n+3 | n+4 |
|---|---|---|---|---|---|---|---|---|
|  | 120 | 60 | 80 | 100 | 150 | 80 | 120 | 180 |

FIG. 7

| Pixel | n-1 | n | n+1 | n+2 | n+3 |
|---|---|---|---|---|---|
| Strength Distribution | 0.0 | 0.5 | 0.3 | 0.2 | 0.0 |

FIG. 8

| Pixel | n-3 | n-2 | n-1 | n | n+1 | n+2 | n+3 | n+4 |
|---|---|---|---|---|---|---|---|---|
| RESULT OF SHOOTING AN IMAGE IMG | 120 | 60 | 80 | 100 | 150 | 80 | 120 | 180 |
| (n-3)th Blur | 60 | 36 | 24 | 0 | 0 | 0 | 0 | 0 |
| (n-2)th Blur | 0 | 30 | 18 | 12 | 0 | 0 | 0 | 0 |
| (n-1)th Blur | 0 | 0 | 40 | 24 | 16 | 0 | 0 | 0 |
| nth Blur | 0 | 0 | 0 | 50 | 30 | 20 | 0 | 0 |
| (n+1)th Blur | 0 | 0 | 0 | 0 | 75 | 45 | 30 | 0 |
| (n+2)th Blur | 0 | 0 | 0 | 0 | 0 | 40 | 24 | 16 |
| (n+3)th Blur | 0 | 0 | 0 | 0 | 0 | 0 | 60 | 36 |
| (n+4)th Blur | 0 | 0 | 0 | 0 | 0 | 0 | 0 | 90 |
| BLURRED IMAGE IMG' | 60 | 66 | 82 | 86 | 121 | 105 | 114 | 142 |

FIG. 9

| Pixel | n-3 | n-2 | n-1 | n | n+1 | n+2 | n+3 | n+4 |
|---|---|---|---|---|---|---|---|---|
| Input $I_0$ | 60.00 | 66.00 | 82.00 | 86.00 | 121.00 | 105.00 | 114.00 | 142.00 |
| (n-3)th Blur | 30.00 | 18.00 | 12.00 | 0 | 0 | 0 | 0 | 0 |
| (n-2)th Blur | 0 | 33.00 | 19.80 | 13.20 | 0 | 0 | 0 | 0 |
| (n-1)th Blur | 0 | 0 | 41.00 | 24.60 | 16.40 | 0 | 0 | 0 |
| nth Blur | 0 | 0 | 0 | 43.00 | 25.80 | 17.20 | 0 | 0 |
| (n+1)th Blur | 0 | 0 | 0 | 0 | 60.50 | 36.30 | 24.20 | 0 |
| (n+2)th Blur | 0 | 0 | 0 | 0 | 0 | 52.50 | 31.50 | 21.00 |
| (n+3)th Blur | 0 | 0 | 0 | 0 | 0 | 0 | 57.00 | 34.20 |
| (n+4)th Blur | 0 | 0 | 0 | 0 | 0 | 0 | 0 | 71.00 |
|  | 30.00 | 51.00 | 72.80 | 80.80 | 102.70 | 106.00 | 112.70 | 126.20 |
| Blurred Image $I_{mg}$ | 60.00 | 66.00 | 82.00 | 86.00 | 121.00 | 105.00 | 114.00 | 142.00 |
| Difference $\delta$ | 30.00 | 15.00 | 9.20 | 5.20 | 18.30 | -1.00 | -1.30 | 15.80 |

FIG. 10

| Pixel | n-3 | n-2 | n-1 | n | n+1 | n+2 | n+3 | n+4 |
|---|---|---|---|---|---|---|---|---|
| Difference $\delta$ | 30.00 | 15.00 | 9.20 | 5.20 | 18.30 | -1.00 | -1.30 | 15.80 |
| (n-3)th Allocation | 15.00 | 0 | 0 | 0 | 0 | 0 | 0 | 0 |
| (n-2)th Allocation | 4.50 | 7.50 | 0 | 0 | 0 | 0 | 0 | 0 |
| (n-1)th Allocation | 1.84 | 2.76 | 4.60 | 0 | 0 | 0 | 0 | 0 |
| nth Allocation | 0 | 1.04 | 1.56 | 2.60 | 0 | 0 | 0 | 0 |
| (n+1)th Allocation | 0 | 0 | 3.66 | 5.49 | 9.15 | 0 | 0 | 0 |
| (n+2)th Allocation | 0 | 0 | 0 | -0.20 | -0.30 | -0.50 | 0 | 0 |
| (n+3)th Allocation | 0 | 0 | 0 | 0 | -0.26 | -0.39 | -0.65 | 0 |
| (n+4)th Allocation | 0 | 0 | 0 | 0 | 0 | 3.16 | 4.74 | 7.90 |
| Renewal Amount | 21.34 | 11.30 | 9.82 | 7.89 | 8.59 | 2.27 | 4.09 | 7.90 |
| Input $I_0$ | 60.00 | 66.00 | 82.00 | 86.00 | 121.00 | 105.00 | 114.00 | 142.00 |
| Next Input $I_{0+1}$ | 81.34 | 77.30 | 91.82 | 93.89 | 129.59 | 107.27 | 118.09 | 149.90 |

FIG. 11

| Pixel | n-3 | n-2 | n-1 | n | n+1 | n+2 | n+3 | n+4 |
|---|---|---|---|---|---|---|---|---|
| Input $I_o+1$ | 81.34 | 77.30 | 91.82 | 93.89 | 129.59 | 107.27 | 118.09 | 149.9 |
| $(n-3)^{th}$ Blur | 40.67 | 24.40 | 16.27 | 0 | 0 | 0 | 0 | 0 |
| $(n-2)^{th}$ Blur | 0 | 38.65 | 23.19 | 15.46 | 0 | 0 | 0 | 0 |
| $(n-1)^{th}$ Blur | 0 | 0 | 45.91 | 27.55 | 18.36 | 0 | 0 | 0 |
| $n^{th}$ Blur | 0 | 0 | 0 | 46.95 | 28.17 | 18.78 | 0 | 0 |
| $(n+1)^{th}$ Blur | 0 | 0 | 0 | 0 | 64.80 | 38.88 | 25.92 | 0 |
| $(n+2)^{th}$ Blur | 0 | 0 | 0 | 0 | 0 | 53.64 | 32.18 | 21.45 |
| $(n+3)^{th}$ Blur | 0 | 0 | 0 | 0 | 0 | 0 | 59.05 | 35.43 |
| $(n+4)^{th}$ Blur | 0 | 0 | 0 | 0 | 0 | 0 | 0 | 74.95 |
| Output $I_o+1'$ | 40.67 | 63.05 | 85.32 | 89.95 | 111.33 | 111.29 | 117.14 | 131.83 |
| Blurred Image $Img$ | 60.00 | 66.00 | 82.00 | 86.00 | 121.00 | 105.00 | 114.00 | 142.00 |
| Difference $\delta$ | 19.33 | 2.95 | -3.37 | -3.95 | 9.67 | -6.29 | -3.14 | 10.17 |

FIG. 12

| Pixel | n-3 | n-2 | n-1 | n | n+1 | n+2 | n+3 | n+4 |
|---|---|---|---|---|---|---|---|---|
| Difference $\delta$ | 19.33 | 2.95 | -3.37 | -3.95 | 9.67 | -6.29 | -3.14 | 10.17 |
| $(n-3)^{th}$ Allocation | 9.67 | 0 | 0 | 0 | 0 | 0 | 0 | 0 |
| $(n-2)^{th}$ Allocation | 0.88 | 1.47 | 0 | 0 | 0 | 0 | 0 | 0 |
| $(n-1)^{th}$ Allocation | -0.67 | -1.01 | -1.68 | 0 | 0 | 0 | 0 | 0 |
| $n^{th}$ Allocation | 0 | -0.79 | -1.19 | -1.98 | 0 | 0 | 0 | 0 |
| $(n+1)^{th}$ Allocation | 0 | 0 | 1.93 | 2.90 | 4.48 | 0 | 0 | 0 |
| $(n+2)^{th}$ Allocation | 0 | 0 | 0 | -1.26 | -1.89 | -3.15 | 0 | 0 |
| $(n+3)^{th}$ Allocation | 0 | 0 | 0 | 0 | -0.63 | -0.94 | -1.57 | 0 |
| $(n+4)^{th}$ Allocation | 0 | 0 | 0 | 0 | 0 | 2.03 | 3.05 | 5.08 |
| Renewal Amount+ | 9.88 | -0.33 | -0.93 | -0.33 | 2.32 | -2.05 | 1.48 | 5.08 |
| Input $I_o+1$ | 81.34 | 77.30 | 91.82 | 93.89 | 129.59 | 107.27 | 118.09 | 149.90 |
| Next Input $I_o+2$ | 91.22 | 76.97 | 90.89 | 93.56 | 131.91 | 105.22 | 119.57 | 154.98 |

FIG. 13
(A)
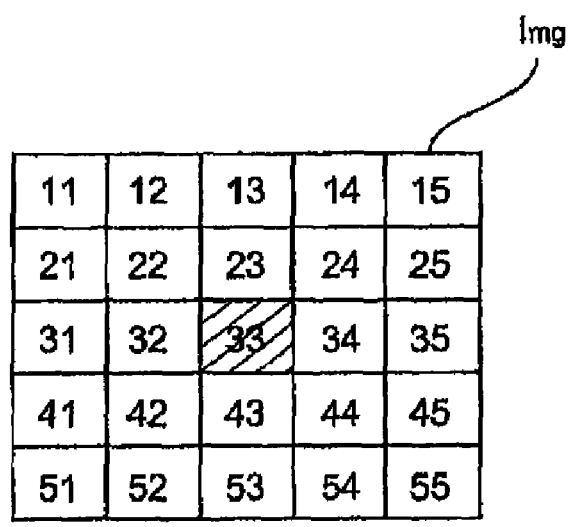
(B)
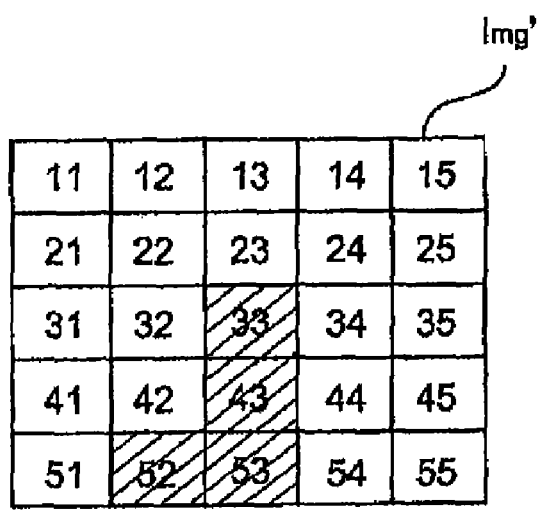

(A)

(B)

SIGNAL PROCESSING APPARATUS

TECHNICAL FIELD

The present invention relates to a signal processing device.

BACKGROUND OF THE INVENTION

It is conventionally known that an image is blurred when taking a picture with a camera and the like. Blur of an image is mainly due to hand jiggling when taking a picture, various aberrations in optics, lens distortion and the like.

In order to stabilize an image, there are two methods, moving lens and electronic processing. As a method of moving a lens, for example, the patent document 1 discloses a method of stabilizing an image by detecting hand jiggling and moving a predetermined lens in response to jiggling. As a method of electronic processing, the document 2 discloses a method of producing a restored image by detecting displacement of a camera's optical axis with an angular velocity sensor, gaining a transfer function showing a blurry state when taking a picture from a detected angular velocity, and inversely transforming the gained transfer function about a shot image.

Further, it is known that signals from a voice message, an x-ray photograph, a microscopic picture, an earth quake wave form and the like more than a general shot image are also blurred and deteriorated due to fluctuation and other causes.

[Patent Document 1] Unexamined patent publication 6-317824 (see the summary)

[Patent Document 2] Unexamined patent publication 11-24122 (see the summary)

PROBLEMS TO BE SOLVED

A camera equipped with a method of stabilizing an image shown in the patent document 1 becomes a large size due to necessity of a space for mounting hardware, driving a lens, such as a motor. Further, installing such hardware and a driving circuit for driving hardware needs to increase a cost. On the other hand, a method of stabilizing an image shown in the patent document 2 includes following issues, although the method does not have the above mentioned problem. Namely, following two issues actually cause difficulty of producing a restored image, though transforming inversely the gained transfer function theoretically produces a restored image.

First, the gained transfer function is extremely weak in processing noises and information errors about blur, and slight fluctuation of them greatly affects the values of the function. This fluctuation results in a disadvantage in that a restored image produced by the inverse transformation is far from a stabilized image without hand jiggling and out of use in actual. Second, the inverse transformation factoring noises sometime needs a method of estimating solutions by using singular value decomposition about solutions in simultaneous equations. But calculated values for such estimation run into astronomical numbers, actually yielding a high risk of remaining unsolved.

These issues regarding an image also emerge in case of handling general various kinds of signal data. It is difficult to restore a signal by using the inverse transformation if the gained transformation function is inaccurate, or even if it is accurate. Further, it is impossible to gain a perfectly accurate transformer function if processing objects in nature.

The advantage of the invention is to provide a signal processing device realizing a practical signal processing of restoring signal data as well as preventing the device from becoming a large size.

SUMMARY OF THE INVENTION

In order to solve the above issues, according to an aspect of the invention, a signal processing device includes a processing unit that produces restored data approaching to original signal data before fluctuating by repeating the following processing: generating comparison data from arbitrary signal data by using information data regarding a fluctuation factor that triggers signal fluctuation; comparing the comparison data with original signal data as an object to be processed; producing restored data by using difference data as difference between the comparison data and the original data; and substituting the restored data for the arbitrary signal data.

The above aspect of the invention produces restored data approaching to original signals before fluctuating only by producing predetermined data with using information data regarding a fluctuation factor that triggers signal fluctuation. This processing does not need an increase of additional hardware, not making a device a large size. Further processes of producing comparison data from restored data and comparing the comparison data with the original signal data as an object to be processed are repeated, obtaining restored data that gradually approach to an image before fluctuation which is a base for an original signal. These processes realize actual restoring operations. Hence, these processes are able to provide a signal processing device that includes a system of circuitry for processing to restore a signal in essence.

According to other aspect of the invention, in addition to the above mentioned invention, the processing unit halts the repetition of the processing if the difference data become equal to or less or smaller than a predetermined value. This halt can avoid long time processing since the processing is halted before "zero" difference. Further, setting the difference data equal to or less than a predetermined value can make restored data further approach to signal data before fluctuating (before blurring) which will be a base for original signals. Further, even when yielding noises may bring a situation of "zero" difference, which is not actually happened, the above halt is able to avoid unlimited repetition.

According to further other aspect of the invention, in addition to the above mentioned invention, the processing unit halts the repetition of the processing if the number of the repetition becomes a predetermined number. This halt can avoid long time processing since the processing is halted in spite that the difference becomes "zero" or does not. Further, the processing is repeated by the predetermined numbers. This repetition can make restored data further approach to signal data before fluctuating which will be a base for an original signal. Further, even when yielding noises may bring a situation of none "zero" difference, which is actually happened, the above is able to avoid unlimited repetition.

According to further other aspect of the invention, in addition to the above mentioned invention, the processing unit halts the repetition of processing if the difference data at the time when the number of the repetition reach a predetermined number, become equal to or less or smaller than a predetermined value and perform further repetition by a predetermined number if the difference data become equal to or more or larger than the predetermined value. In this aspect of the invention, associating the number of process repetition with the difference value can attain favorite balance between signal quality and processing time compared to a case of simply limiting the number of repetition or limiting the difference value.

According to yet other aspect of the invention, a signal processing device includes a processing unit that performs the following processing: generating comparison data from predetermined signal data by using information data regarding a fluctuation factor that triggers signal fluctuation; comparing the comparison data with original signal data including fluctuated signals as an object to be processed; halting the processing and treating the predetermined signal data that have been base for the comparison data as signals before fluctuation of the original signal data if difference data between the comparison data and the original signal data are equal to or less or smaller than a predetermined value; substituting the restored data for the predetermined signal data and repeating the processing if the difference data are equal to or more or larger than a predetermined value, producing restored data by using the difference data.

According to the above aspect of the invention, comparison data are generated by using information data regarding a fluctuation factor that triggers signal fluctuation. The comparison data are compared to the original signal and the restored data approaching the original signal are produced only when the difference is large. This processing can avoid additional hardware and a large sized device. Further processes of producing comparison data from restored data and comparing the comparison data with the original signal data as an object to be processed are repeated, obtaining restored data that gradually approach an image before fluctuation as original signals. These processes realize actual restoring operations. Hence, these processes are able to provide a signal processing device that includes a system of circuitry for processing in essence to restore fluctuated signals.

According to further other aspect of the invention, in addition to the above mentioned invention, the processing unit halts the repetition of the processing if the number of the repetition becomes a predetermined number. This halt can avoid long time processing since the processing is halted in spite that the difference becomes "zero" or not. Further, the processing is repeated by the predetermined number. This repetition can make restored data further approach to signal data before fluctuating, which are a base for original signals. Further, even when yielding noises may bring a situation of none "zero" difference, which is actually happened and makes limitless repetition of the processing, the above halt in this aspect is able to avoid the issue of such unlimited repetition.

According to yet further other aspect of the invention, in addition to the above mentioned invention, the device further comprises a detection unit that detects information regarding a fluctuation factor and a factor information storing unit that stores existed information regarding a fluctuation factor. These additional units are able to attain restored data that are compensated with considering both outside and inside factors, which fluctuate signals.

Further, the repetition may favorably be halted when the difference data get dispersed. This halt in this aspect can avoid yielding restored data that has poor quality and waste of time for unnecessary processing.

Further, the repetition may favorably be halted if the restored data includes an abnormal value more than a permitted value. This halt can avoid yielding restored data that has poor quality and waste of time for unnecessary processing.

Further, if the restored data includes an abnormal value except a permitted value, the repetition may favorably be continued after the abnormal value is changed to the permitted value. This continuation can apply a case when a part of data gets abnormal and attain further favorite restore data.

According to yet other aspect of the invention, in addition to the above mentioned invention, the producing restored data by using the difference further comprises adding the difference, which corresponds to a signal element, or variable powers of the difference to a signal element corresponding to the comparison data. This addition can attain quick processing when there are small fluctuations such as blurring.

According to yet other aspect of the invention, in addition to the above mentioned invention, the producing restored data by using the difference further comprises allocating the difference data to the arbitrary signal data or predetermined signal data by using the information data regarding a fluctuation factor. This allocation has an ability of restoring process in response to fluctuation factors such as blur and the like.

Further, the processing unit may favorably set a barycenter of information regarding a fluctuation factor and add the difference data of the signal element at the barycenter or the variably-powered difference data to a signal element to be restored among arbitrary or predetermined signals. This setting and addition have an ability of restoring process with a high speed in response to fluctuation factors such as blur and the like.

Further, the processing unit may favorably classify information regarding a fluctuation factor into each of a plurality of kinds and perform different processing depending on the classification. This classification has an ability of restoring process with a fast speed in response to fluctuation factors such as blur and the like Further, the processing unit favorably may classify the information regarding fluctuation factors into each of a plurality of kinds and differentiate the numbers of repetitions every classification. This different classification has an ability of restoring process within optimum time in response to fluctuation factors such as blur and the like.

According to yet other aspect of the invention, in addition to the above mentioned invention, the producing the restored data further comprises placing the data in a region to be a restored object that is positioned opposing to any one of vertical, horizontal and slanted directions if the restored data is yielded outside of the region to be a restored object. These producing and placing the data can firmly produce the region to be a restored object.

ADVANTAGE OF THE INVENTION

An advantage of the invention is to provide a signal processing device including a system of circuit processing in essence as well as preventing a device from being large sized even under restoring fluctuated signals such as blur and the like.

BRIEF DESCRIPTION OF THE DRAWINGS

FIG. 6 is a chart concretely explaining the processing method shown in FIG. 3 as an example of hand jiggling and a diagram showing image data without hand jiggling.

FIG. 7 is a chart concretely explaining the processing method shown in FIG. 3 as an example of hand jiggling and a diagram showing energy dispersion when hand jiggling.

FIG. 8 is a chart concretely explaining the processing method shown in FIG. 3 as an example of hand jiggling and a diagram showing production of comparison data from an arbitrary image.

FIG. 9 is a chart concretely explaining the processing method shown in FIG. 3 as an example of hand jiggling and a diagram showing production of difference data by comparing comparison data with a blurred original image to be a processed object.

FIG. 10 is a chart concretely explaining the processing method shown in FIG. 3 as an example of hand jiggling and a diagram showing production of restored data by allocating and adding difference data to an arbitrary image.

FIG. 11 is a chart concretely explaining the processing method shown in FIG. 3 as an example of hand jiggling and a diagram showing generation of new comparison data from restored data and difference data by comparing the comparison data with an blurred original data as an object to be processed.

FIG. 12 is a chart concretely explaining the processing method shown in FIG. 3 as an example of hand jiggling and a diagram showing production of new restored data by allocating new difference data.

FIGS. 13(A) and (B) are a diagram explaining how to use a barycenter of fluctuation factors as other processing method with using the method shown in FIG. 3. FIG. 13 (A) is a diagram showing a state of paying attention to one pixel within a correct image data.

FIG. 13 (B) is a diagram showing a state of dispersion of a pixel which was paid attention within a original image data.

FIGS. 15(A) and (B) are a diagram other processing method with using the method shown in FIG. 3. FIG. 15(B) shows data obtained by thinning the data in FIG. 15 (A).

FIG. 16 (A) shows data of the original image as an object to be processed. FIG. 16(B) shows data obtained by picking up a part of the data in FIG. 16(A).

And a diagram showing splitting data of the original image into four regions and taking a part of regions for repeated restoring from each of regions.

Figure 1:
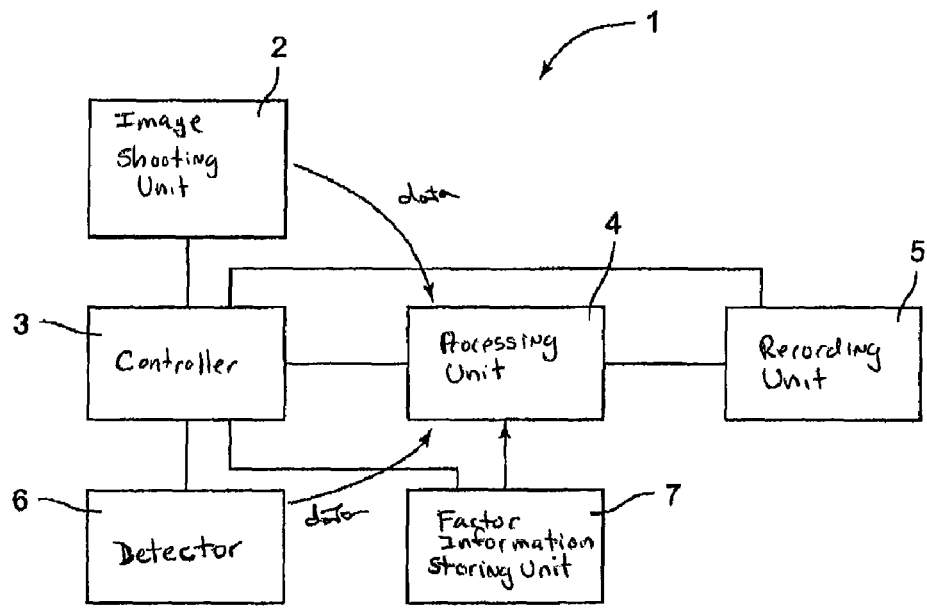
FIG. 1 is a block diagram showing main structures of a signal processing device of an embodiment in the invention.
Figure 18:
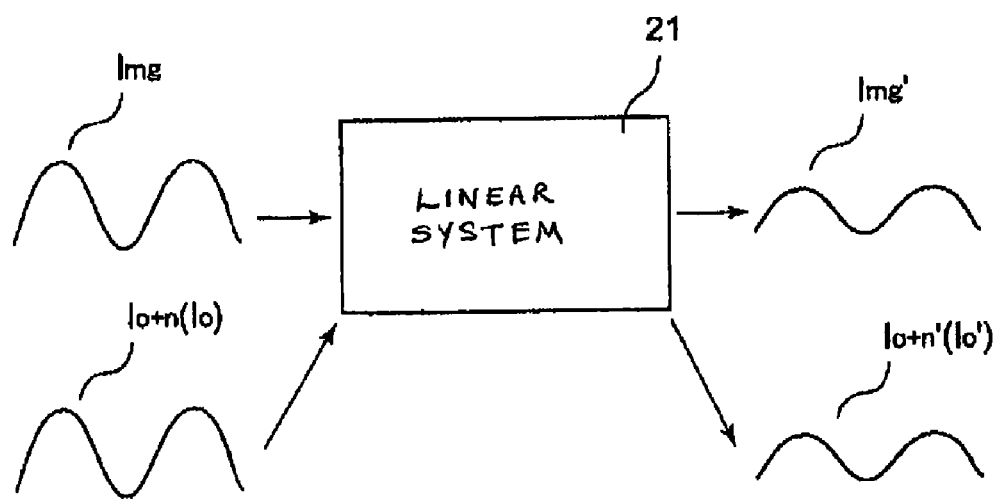

FIG. 18 is a diagram that explains deploying the processing method (processing routine) performed by the signal processing device and its processing unit shown in FIG. 1 to a general processing device.

1: signal processing device,
2: imaging unit
3: control unit
4: processing unit,
5: recording unit,
6: detecting unit,
7: factor-information storing unit, Io: data of an initial image (data of an arbitrary image)
Io': comparison data,
G: data of fluctuation-factor information (data of information about blurring factors)
Img': data of an original image (a shot image)
Δ: difference data,
K: allocation ratio,
Io+n: restored data (data of a restored image),
Img: data of an intrinsically corrected image without blurring.

DETAILED DESCRIPTION OF PREFERRED EMBODIMENTS OF THE INVENTION

A signal processing device 1 according to a first embodiment of the invention will be explained with referring to drawings hereafter. The signal processing device 1 is an image processing unit used for a consumer camera in the embodiment, but also applied to cameras for other use such as monitoring, TV, and an endoscope, and other devices except cameras such as a microscope, binoculars, and a diagnostic imaging apparatus like imaging with NMR.

The signal processing device 1 comprises an imaging unit 2 for shooting an image such as a figure, a controller 3 for driving the imaging unit 2 and a processing unit 4 for processing an image (signal data) shot by the imaging unit 2. The signal processing device 1 further comprises a recording unit 5 for recording an image processed by the processing unit 4, an angular speed sensor, a detector 6 for detecting fluctuation-factor information, which is a main factor for image blur, and a factor-information storing unit 7.

The imaging unit 2 is a unit provided with an optics having lens and an imaging element, converting a light image passed through lens into electrical signals, such as a charged coupled device (CCD) and a complementary metal oxide semiconductor (CMOS). The controller 3 controls any units of the signal processing device 1 such as the imaging unit 2, the processing unit 4, the recording unit 5, the detector 6 and the factor-information storing unit 7.

The processing unit 4 includes an image processing processor composed of hardware such as application specific integrated circuit (ASIC). The processing unit 4 may store an image which becomes a initial base for generating comparison data described later. The processing unit 4 may comprise software instead of hardware like ASIC. The recording unit 5 includes a semiconductor memory, but may include a magnetic recording means like a hard disk drive or an optical recording means like digital versatile disk (DVD).

Figure 2:
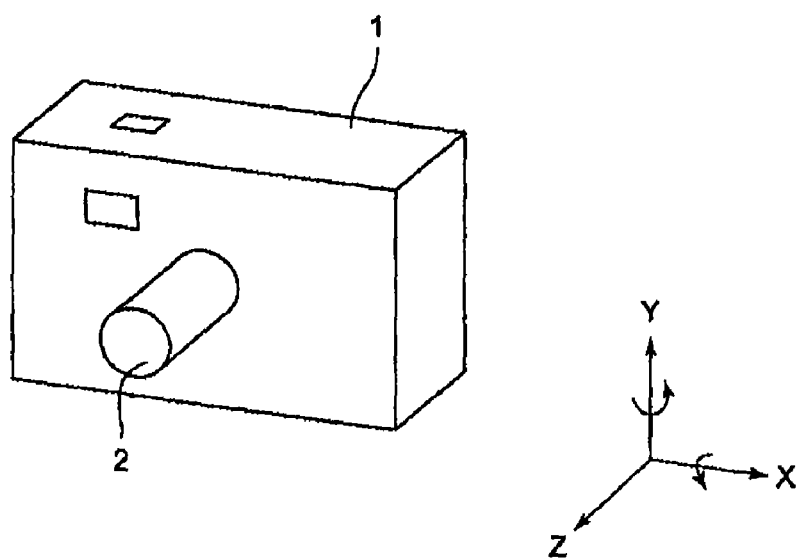
FIG. 2 is a perspective and schematic view showing a overall concept of the signal processing device shown in FIG. 1 and the location of an angular speed sensor.

The detecting unit 6 is provided with two angular speed sensors detecting the angular speed along X and Y axes perpendicular to Z axis, which is the optical axis of the signal processing device 1 as shown in FIG. 2. Hand jiggling when shooting an image with a camera generates any movements along X, Y and Z directions and rotation along Z axis. But, in particular, rotations along X and Y axes receive the most impact of hand jiggling. A shot image is greatly blurred even if these rotations fluctuate slightly. Only two angular sensors are placed along X and Y axes in FIG. 2 in the embodiment due to the above reason. But, other angular sensor along Z axis and sensors detecting movement along X and Y directions may be added in order to get further accurate detection. A sensor may be an angler acceleration sensor instead of an angler velocity sensor.

The factor-information storing unit 7 is a recoding unit which records information regarding fluctuation factors such as already-known blur factors like aberration of optics and others. In the embodiment, the factor-information storing unit 7 stores information of aberration of optics and lens distortion. But such information is not used for restoring a blurred image due to hand jiggling described later.

Next, a method processing performed by the processing unit 4 in the signal processing device 1 will be explained with referring to FIG. 3.

Figure 3:
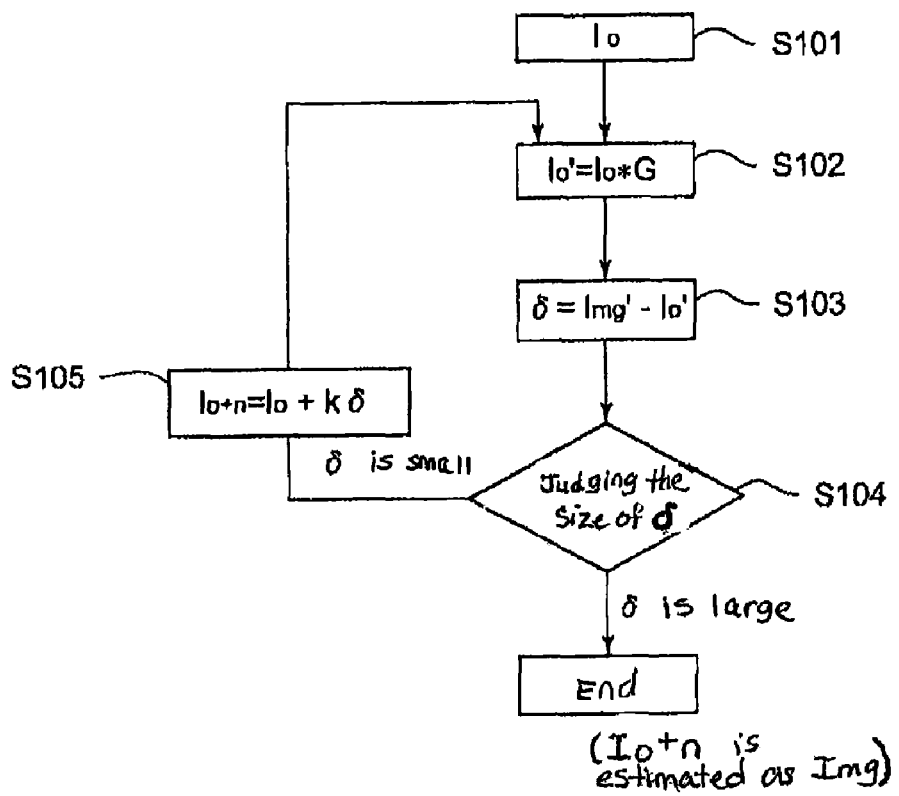
FIG. 3 is a flow chart showing a method of processing (a processing routine) implemented by a processing unit in the signal processing device shown in FIG. 1.

In FIG. 3, "Io" is an arbitrary initial image (initial signal data), image data which has previously been recorded by the recording unit in the processing unit 4. "Io'" is a blurred image data of the initial image data Io, comparison data for comparing. "G" is data of information regarding fluctuation factors (=information about blur factors (point image functions)) detected by the detector 6 and stored by the recording unit in the processing unit 4. "Img'" is a shot image, namely blurred image data, which become original image (original signal) data, an object to be processed in the processing.

"δ" is a difference between the original image data Img' and the comparison data Io'. "k" is an allocation ratio based on information regarding fluctuation factors. "Io+n" is restored image data (restored data) newly produced by allocating the difference data δ to the initial image data Io based on the data G of fluctuation-factor information, "Img" is intrinsically corrected image data without blur, which is a base of the original image data "Img'", a blurred image when it was shot. Here the relationship between Img and Img' is assumed to be expressed as the following formula (1).

$$Img'=Img*G \quad (1)$$

Where, "*" is an operator which indicates superimposing integration. Here, the difference "δ" is generally fluctuated by the data G of fluctuation-factor information and expressed as the following formula (2), though the data may be a simple difference about a pixel corresponding to a signal element.

$$\delta=f(Img',Img,G) \quad (2)$$

With respect to a routine processed by the processing unit 4, first, arbitrarily image data Io is prepared (step S101). The initial image data Io may be the shot blurred image data Img' or may be any image data having solid black, solid white, solid gray, check and the like. The comparison data Io' as the blurred image is obtained by inputting the arbitrary image data Io, which becomes the initial image, to the formula (1) instead of Img as step S102. Next, the difference data δ is calculated by comparing the original image data Img' as the shot blurred image with the comparison data Io'(step S103).

In step S104, the difference data δ is judged about whether it is equal to or more than a predetermined value or not. Then, newly restored image data (restored data) is produced in step S105, if the difference data δ is equal to or more than a predetermined value. Namely, newly restored data Io+n is produced by allocating the difference data δ to the arbitrary image data Io based on the data G of fluctuation-factor information. Steps S102, S103 and S104 are repeated thereafter.

In step S104, if the difference data δ is smaller than the predetermined value, the processing is halted (step S106). Then, the restored data Io+n at the time of halting the processing is assumed to be a correct image, namely an image data Img without blur. Then, this correct data is recorded to the recording unit 5. Namely, the restored data Io+n at the time of halting the processing is extremely close to the data Img. Here, the recording unit 5 may record the initial image data Io and the data G of fluctuation-factor information and send them to the processing unit 4 if they are necessary.

The above processing method will be summarized as followings. Namely, this method does not gain solutions as solving inversed issues, but gain solutions as optimizing issues to seek rational solutions. As disclosed in the patent document 2, solving inversed issues is theoretically possible, but faces difficulty in an actual site.

Gaining solutions as optimizing issues needs the following premises:
(1) an output corresponding to an input is uniquely determined.
(2) if an output is the same, an input is the same.
(3) processing is repeated while updating inputs in order to gain the same output so as to make a solution converge.

Figures 4, 5:
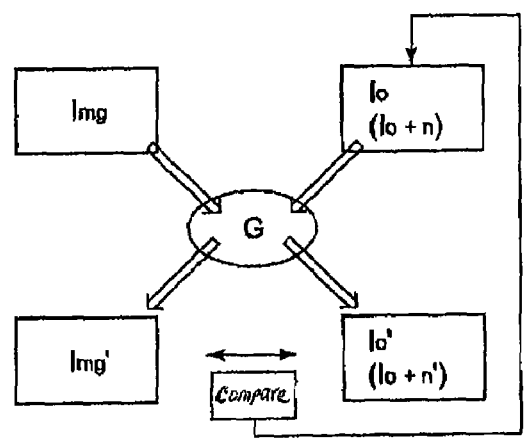
FIG. 4 is a diagram explaining a concept of the processing method shown in FIG. 3.
FIG. 5 is a chart concretely explaining the processing method shown in FIG. 3 as an example of hand jiggling and a table of energy concentration without hand jiggling.

In other words, as shown in FIGS. 4 (A) and 4(B), producing the comparison data Io' (Io+n'), which approaches to the original image data Img' as the shot image, makes the initial image data Io, which is the initial data for such production, or the restored data Io+n, approach to the correct image data Img, which becomes a initial base for the original image data Img'.

Here, in the embodiment, the angular velocity sensor detects angular velocity every 5 μsec. The value for judging the difference data δ is "6" in the embodiment when each data is expressed as 8 bits (0 to 255). Namely, when the difference data is smaller than 6, equal to or less than 5, the processing is halted. Raw data of fluctuation detected by the angular velocity sensor is not coincided with actual fluctuation if correcting the sensor is insufficient. Therefore, it is necessary to compensate the detected raw data such as multiplying it by a predetermined magnification in order to fit the actual fluctuation when the sensor is not corrected.

Next, the details of processing shown in FIGS. 3 and 4 will be explained with referring to FIGS. 5, 6, 7, 8, 9, 10, 11, and 12.

Restoring Algorism on Hand Jiggling

When there is no hand jiggling, optical energy corresponding to a predetermined pixel is focused on the pixel itself during exposure. But when hand jiggling, optical energy is dispersed into pixels blurred during exposure. Further, if the degree of hand jiggling during exposure is recognized, the way of making optical energy dispersion during exposure is also recognized. Therefore, it is possible for the recognition to produce a non blurred image from a blurred image.

Details will be explained as a horizontal one dimension for simplicity. Pixels, which become signal elements, are defined as n−1, n, n+1, n+2, and n+3 from a left side and a pixel "n" is paid to attention. When no hand jiggling, energy during exposure is concentrated into the pixel, making the energy concentration become "1.0". This energy concentration is shown in FIG. 5. The table in FIG. 6 shows the results of the shot image under the above energy concentration in FIG. 5. These results shown in FIG. 6 become the correct image data Img without blur. Here, each data are shown as 8 bits (0 to 255).

On the other hand, when hand jiggling during exposure, an image is supposed to be blurred to the pixel "n" during 50% of exposure time, the (n+1)th pixel during 30% of it and the (n+2)th pixel during 20% of it. The way of making energy dispersion in this case is shown in the table in FIG. 7. This dispersion becomes the data G of fluctuation-factor information.

Blur is uniform on all pixels. If there is no upper blur (vertical blur), the status of blur is shown in the table of FIG. 8. In FIG. 8, data shown as "shot results" are the intrinsically corrected image Img and data shown as "blurred images" is the shot blurred image data Img'. More specifically, the data "120" at the "n−3" th pixel for example, follow the allocation ratio of the data G of fluctuation-factor information, "0.5", "0.3" and "0.2". Hence, image data are dispersed to the "n−3" th pixel, by "60", the "n−2"th pixel by "36" and the "n−1"th pixel by "24". Similarly, the image data "60" of the "n−2"th pixel are dispersed to the "n−2" th pixel by "30", the "n−1"th pixel by "18" and "n"th pixel by "12". The corrected shot results without blur is calculated from the blurred image data Img' and the data G of fluctuation-factor information, shown in FIG. 7.

In this explanation, the shot original image data Img' is used as the arbitrary image data Io shown in step S101, though any kinds of data can be applied to such arbitrary image data Namely, first, Io is defined to be equal to Img' at the beginning. "Input" shown in the table of FIG. 9 corresponds to the initial image data Io. The data Io, namely Img' is multiplied by the data G of fluctuation-factor information in step S102. More specifically, the data "60" at "n−3"th pixel of the initial image data Io, for example, is allocated to the "n−3" th pixel by "30", the "n−2"th pixel by "18" and the "n−1"th pixel by "12". Other image data at other pixels are similarly allocated. Then, the comparison data Io' are produced, being indicated as "output Io'". Therefore, the difference data δ in step S103 become values shown in the bottom of the table in FIG. 9.

Then, the size of the difference data δ is judged in Step S104. More specifically, if the absolute values of all the difference data δ become equal to or less than 5, the processing is halted. However, the difference data δ shown in FIG. 9 is not matched to this condition, then the processing moves to step S105. Namely, the newly restored data Io+n is produced by allocating the difference data δ to the arbitrary image data with using the data G of fluctuation-factor information. The newly restored data Io+n is indicated as "next input" in FIG. 10. This case is first processing indicated as Io+1 in FIG. 10.

The difference data δ are allocated by the following. The data "30" at the "n−3" the pixel, for example, is allocated to the "n−3"th pixel by "15" which is obtained through multiplying "30" by "0.5", the allocation ratio at the "n−3" the pixel itself. The data "15" at the "n−2" th pixel is allocated to the "n−2"th pixel by "4.5" which is obtained through multiplying "15" by "0.3", the allocation ratio at the "n−2" th pixel. The data "9.2" at the "n−1" th pixel is allocated to the "n−1"th pixel by "1.84" which is obtained through multiplying "9.2" by "0.2", the allocation ratio at the "n−1" th pixel. The total amount allocated to "n−3"th pixel becomes "21.34". The restored data Io+1 is produced by adding this value to the initial image data Io (the shot original image data Img' here)

As shown in FIG. 11, the restored data Io+1 become input image data (the initial image data Io) in step S102 for executing step. Then new difference data δ is obtained by proceeding step S103. The size of the new difference data δ is judged in step S104. If the data is larger than a predetermined value, the new difference data δ is allocated to the previous restored data Io+1 so that the new restored data Io+2 is produced (see FIG. 12). Then, the new comparison data Io+2' is produced from the new restored data Io+2 during executing step S102. As already explained, after step S102 and S103 are executed, step S104 is executed. Then, depending on the judge in step S104, either step S105 or step S106 is executed. These processes are repeated.

The signal processing device 1 is able to fix either the numbers of processing or a reference value for judging the difference data δ in advance, or both of them during step S104. Repeating numbers for processing can be fixed to be arbitrary such as 20 or 50 for example. Further, the value of difference data δ is set to be "5" among 8 bits (0 to 255) for halting processing. If the data becomes equal to or less than 5, the processing can be completed. Otherwise, if the value is set to be "0.5" and the data becomes equal to or less than "0.5", the processing can be completed. The value can be arbitrarily fixed. When inputting both the numbers of repeating processing and the reference value for judging, the processing is halted if either one of them is satisfied. Here, if setting both is possible, the reference value for judging may be prioritized and the predetermined numbers of repeating processing can be further repeated if the difference data do not become within the range of the reference value for judging by repeating predetermined numbers.

In the embodiment, information stored in the factor information storing unit 7 is not used. But, already-known blur factors data such as optical aberration and lens distortion may be used. In this case, in the processing shown in FIG. 3, for example, it is preferable that processing be performed by combining hand jiggling information with optical aberration as one blur information. Otherwise, an image may be stabilized by using optical aberration information after completing the processing with using hand jiggling information. Further, an image may be corrected or restored only by movement factors at the time shooting such as hand jiggling without setting the factor information storing unit 7.

The above mentioned signal processing device 1 in the embodiment can be modified within the spirit of the invention. The processing executed by the processing unit 4, for example, may be replaced with hardware composed of parts of which each shares and performs a part of the processing.

Further, the original image, which will be an object to be processed, may be a processed shot image such as color-corrected or Fourier-transformed instead of a shot image. Further, the comparison data may be processed data such as color-corrected or Fourier-transformed after produced by using the data G of fluctuation-factor information, instead of data only produced by the data G of fluctuation-factor information. Further, the data G of fluctuation-factor information may not only include information about blurring factors, but information for changing images or enhancing image quality instead of blurring.

Further, when the numbers of repeating the processing are automatically fixed by the signal processing device 1, the fixed numbers of repeating may be changed by the data G of fluctuation-factor information. When data of one pixel is dispersed to many other pixels by blurring, the numbers of repeating may be increased for example. But when the dispersion is small, the numbers of repeating may be decreased.

Further, when the difference data δ become dispersed during repeating the processing, namely increased, the processing may be halted. Regarding judging the dispersion about the difference data δ, if the average value of the difference data δ is observed and becomes larger than a previous value for example, the difference data δ may be judged to be dispersed. Further, if the dispersion occurs, the processing may be halted. Otherwise, if the dispersion is continuously occurred twice or predetermined numbers, the processing may be halted. When an input is changed to be an abnormal value during repeating the processing, the processing may be halted. When the input is 8 bits and a value to be changed exceeds 255, the processing may be halted. When an input is changed to be an abnormal value during repeating the processing, a normal value may be used instead of such abnormal value. For example, when a value surpassing 255 among 0 to 255 of 8 bits is input, the processing is executed under a condition when the input data is a maximum value as 255. Namely, if the restored data include an abnormal value (a value surpassing 255 in the above example) more than a permitted value (a value of 0 to 255 in the above example), the processing may be halted. Otherwise, if the restored data include an abnormal value more than a permitted value, the abnormal value may be replaced with the permitted value and the processing may be continued.

Further, when the restored data is produced as an output image, data may go out of the region specified as an image to be restored depending on the data G of fluctuation-factor information. In such case, data going out of the region should be input to an opposing side. Further, if data come from the outside of the region, the data may be brought into an opposing side. If data allocated to pixels located lower than the most bottom position of the region where the pixel XN1 (the Nth row and the first column) is located are generated for example, the location will be out of the region. In such case, the data will be allocated to the pixels X11 (the first row and the first column) at the most top position directly above the pixel XN1. The data at the pixel XN2 (the Nth row and the second column) will also be allocated to the pixels X12 (the first row and the second column adjacent to the pixel X11) at the most top position directly above the pixel XN2 (the Nth row and the second column) adjacent to the pixel XN1 as a similar manner. In a case of producing the restored data, when data occur out of the region to be restored, the data are rearranged at the positions opposing to the position where the data occur toward one of the vertical, horizontal and oblique directions within the region to be restored. Such rearrangement is able to certainly restore the data in the region to be restored.

Further, in a case of producing the restored data Io+n, the allocation ratio k may not be used. Instead, the difference data δ corresponding to the pixel to be treated may be directly added to the pixel in the previous restored data Io+n$_{-1}$. Otherwise, the difference data δ may be variably powered and added to the pixel thereafter. Further, the data kδ (the value as "renewing amount" in FIG. 10 and FIG. 12) after the difference data δ are allocated may be variably powered and added to the previous restored data Io+n$_{-1}$. The processing speed becomes further increased by utilizing the processing well.

In case of producing the restored data Io+n, the barycenter of fluctuation factors such as blur and the like may be calculated. Then, the difference of the barycenter or the variable powers of the difference may be added to the precious restored data Io+n$_{-1}$. This approach is explained in detail with referring to FIG. 13 and FIG. 14.

As shown in FIGS. 13 (A) and 13(B), the correct image data Img comprises pixels 11 to 15, 21 to 25, 31 to 35, 41 to 45 and 51 to 55. The pixel 33 is paid attention as shown in FIG. 13 (A). When the pixel 33 is moved to positions of the pixels 33, 43, 53 and 52 due to hand jiggling, the image at the pixel 33 in the original image data Img' as a blurred image affects images at the pixels 33, 43, 53 and 52 as show in FIG. 13(B).

Figure 14:
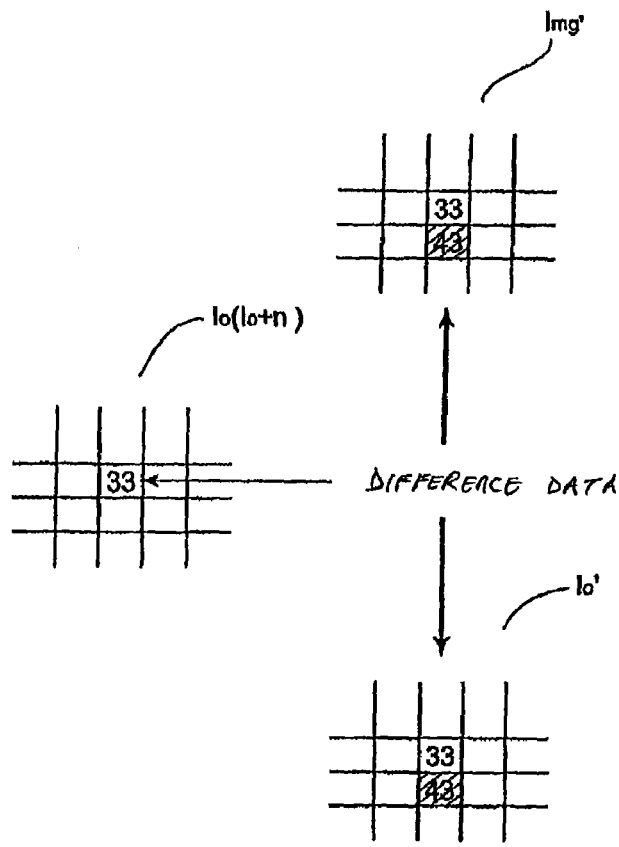
FIG. 14 is a diagram concretely explaining a process of using a barycenter of fluctuation factors as a method shown in FIG. 13.
Figure 15:
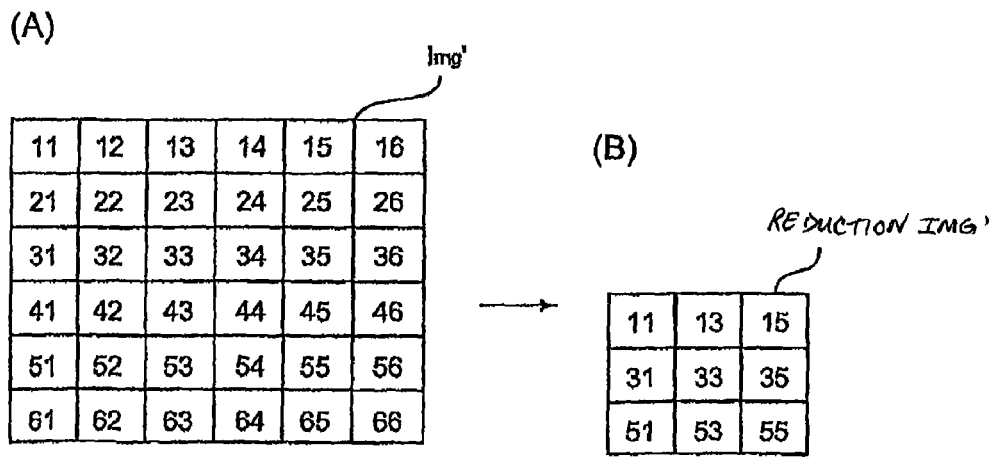
FIG. 15 (A) shows data of the original image as an object to be processed.

In this blurring, in a case when the pixel 33 is moved, if the pixel stays at the position of the pixel 43 for the most longest time, the barycenter of blur, namely fluctuation factors, of the original image data Img' comes to the position of the pixel 43 with respect to the pixel 33 in the corrected image data Img. By this positioning, as shown in FIG. 14, the difference data δ is calculated as the difference of data at the pixel 43 between the original image Img' and the comparison data Io'. Such difference data δ is added to the original image data Io or the restored data Io+n at the pixel 33.

In the previous example, among three barycenters "0.5", "0.3" and "0.2", the highest value is "0.5", which will be a self center. Hence, without considering allocation of "0.3" and "0.2", only "0.5" or the variable powers of "0.5" is allocated to the self position. Such processing is preferable when energy of blur is concentrated.

Further, any of the above-mentioned methods may be automatically selected depending on the contents of the data G of fluctuation-factor information. Namely, the processing unit 4 classifies the data G of fluctuation-factor information into a plurality of kinds and executes different processing depending on such classification. For example, as shown in FIG. 5 to FIG. 12, programs for executing following three methods are stored in the processing unit 4 and the status of blurring factors are analyzed, then any one of these three methods is selected. These methods are: (1) a method of allocating the difference data 6 by using allocation ratio k (a method of the embodiment), (2) a method of variably powering difference or the difference data δ corresponding to a pixel (a method of a corresponding pixel), and (3) a method of using data in a barycenter of fluctuation factor after detecting the barycenter (a barycenter method). Otherwise, a plurality of these three methods may be selected and utilized every one routine. Further, one method may be used during initial several repeating times and other method may be used thereafter.

Further, a combination with inversely solving issue can be considered in order to further speed up restoring processing. Namely, the processing is repeated with reduced data and transfer function to reduced restored data is calculated from the reduced original image. Then the calculated transfer function is enlarged and interpolated. The restored data of the original image is obtained by using the enlarged and interpolated transfer function. This processing method is effective for processing a large image.

Two methods are substantial ways of this processing. First, thinning data obtains the reduced data. When thinning data, if the original image data Img' comprises pixels, 11 to 16, 21 to 26, 31 to 36, 41 to 46, 51 to 56 and 61 to 66 for example, pixels are thinned every other pixel, producing a reduced image Img', one fourth of the original comprising pixels 11, 13, 31, 33, 35, 51, 53 and 55.

Hence, thinning the original image data Img' produces the thinned data as the reduced image Img'. The processing is repeated by using the reduced image Img' shown in FIG. 3, obtaining the restored data Io+n which are sufficiently thinned. The reduced restored data Io+n are sufficiently enough data, but still approximated data. Hence, the transfer function of the restored data Io+n and the original image data Img' are not the transfer function used for repeating the processing with the reduced data. Hence, the transfer function is calculated from the reduced restored data Io+n and the reduced original image data Img', the calculated transfer function is enlarged and, then a space between enlarged portions is interpolated. This enlarged and interpolated function is a modified function for the original image data Img' as original data. Then, by using the modified transfer function, deconvolution calculation (removing blur portions from a blurred image by calculation) is performed in a frequency space, attaining the perfect restored data Io+n, assuming it to be the intrinsically corrected image Img without blur.

Here, in this processing, the attained corrected image and the assumed restored data Io+n may be used as the initial image data Io shown in FIG. 3 and further processing may be repeated by using the data G of fluctuation-factor information and the blurred original image Img'.

Figure 16:
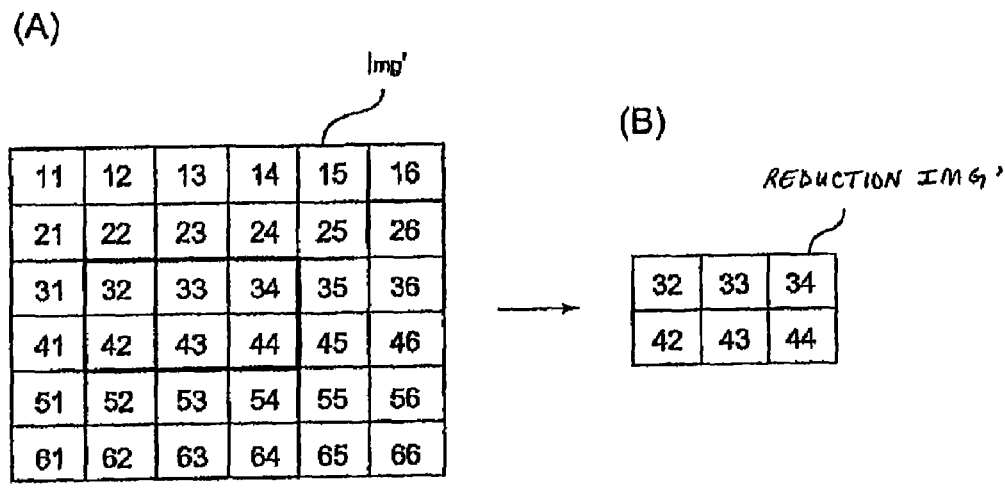
FIGS. 16 (A) and (B) are a diagram yet other processing method with using the method shown in FIG. 3.

The second method of using reduced image is to retrieve a part of the original image data Img' and make it reduced data. If the original image data Img' comprises pixels, 11 to 16, 21 to 26, 31 to 36, 41 to 46, 51 to 56 and 61 to 66 for example as shown in FIG. 16, a central region comprising pixels 32, 33, 34, 42, 43, and 44 is retrieved so that produce the reduced Img' is produced.

Accordingly, the above method does not restore the entire regions of an image by repeating the processing, but repeats the processing of a part of regions to attain a favorite restored image instead. By using the result of the repetition, the transfer function corresponding to the part is obtained. Finally an entire image is restored by using such transfer function itself or the modified (enlarged) transfer function. Here, the above retrieved region must be sufficiently larger than the fluctuated regions. In the example shown in FIG. 5 and others, an image is fluctuated across three pixels, needing to retrieve a region having over three pixels.

Figure 17:
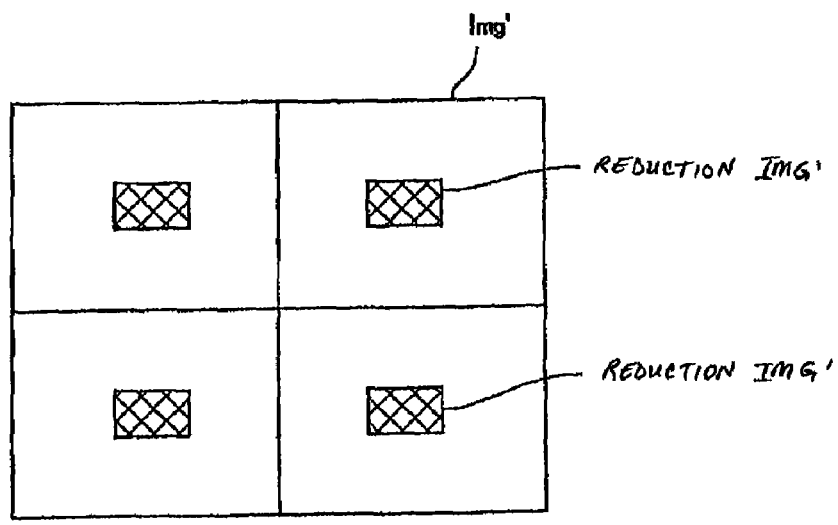
FIG. 17 is a diagram explaining a modification of the processing method shown in FIG. 14.

In case of retrieving the reduced region, the original image data Img' may be divided into four regions as shown in FIG. 17 for example and a part in each of divided regions may be retrieved. Then, four reduced Img' in the small part may be repeatedly processed, restoring data for each of four divided regions and integrating restored four divided images into one image as an entire restored image. When dividing the region into plural numbers, it is preferably certain to retain overlapped regions overlapping plural numbers of regions. Further, it is preferable to use the average value in the overlapped region as the restored image or smoothly and continuously connect the restored image in the overlapped region.

Further, when the processing method shown in FIG. 3 was actually used, it was founded that convergence to a favorable approximate restored image was delayed with respect to an image having sharp change of a contrast. There are some cases in which the convergence speed of repeating the processing is slow and many numbers of repetition are needed depending an object to be shot as an initial image. In a case of such object to be shot, the above issue is assumed to be solved by a following method.

The method will be explained. Namely, if an image close to an initial image will be obtained by repeating the restoring process shown in FIG. 3 with respect to an object to be shot having sharp contrast, numbers of repeating become extremely big and restored data Io+n close to the initial object to be shot cannot be produced. Therefore, the blurred image data B' is produced by using the data G of fluctuation-factor information at the time of shooting from the already-known image data B. Then the blurred image data B' is overlapped with the shot original image (the blurred image) data Img', creating overlapped data "Img'+B'". The overlapped image is restored by the process shown in FIG. 3 thereafter. Then, the already-known image data B, which become the restored data Io+n, is removed from the result data C and the desired restored image data Img is retrieved.

The intrinsically-corrected data Img include the sharp contrast change. But the above method of adding the already-known image data B to it can reduce the sharp change of contrast and reduce numbers of repeating the restoring process.

Other methods may be adopted as a method of processing an object to be shot, which is difficult to be restored, or a method of high speed processing. For example, if the numbers of repeating the processing for restoring are increased, a more favorable restored image can be obtained, but it takes long time to process. Hence, an image obtained by repeating restoring process in some degree is used instead of the above increased repetition. An error component included in the image is calculated and then the calculated error is removed from the restored image, obtaining the favorable restored image Io+n This method is explained in detail. A desired correct image is defined as A, a shot original image as A', a restored image from the original image A' as A+$\delta$, and blurred comparison data produced from the restored data as A'+$\delta$'. The shot original image "A'" is added to "A'+$\delta$'" then this added data are restored to be "A+$\delta$+A+$\delta$+$\delta$" and come to "2A+3$\delta$" or "2(A+$\alpha$)+$\alpha$". "A+$\delta$" is already obtained in previous processing, calculating "2(A+$\delta$)+$\delta$−2(A+$\delta$)" and obtaining "$\delta$". Therefore, removing "$\delta$" from "A+$\delta$" can obtain the desired correct image A.

The above-mentioned various methods are;
(1) a method of allocating the difference data $\delta$ by using allocation ratio k (a method of the embodiment),
(2) a method of variably powering difference or the difference data $\delta$ corresponding to a pixel (a method of a corresponding pixel),
(3) a method of detecting the barycenter of fluctuation factors and using data in the barycenter (a barycenter method),
(4) a method of thinning data and combining data with an inversed issue (an inversed issue method),
(5) a method of retrieving a reduced region and combining the region with an inversed issue an inversed issue and retrieving region method),
(6) a method of superimposing a predetermined image, repeating the processing and then removing the predetermined image (a method of countermeasure against a difficult image and superimposing it) and
(7) a method of removing a calculated error from a restored image including an error (a error retrieving method.)
Programs for these methods may be stored in the processing unit 4 and any of them may be automatically selected depending on user's selection or kinds of images.

Further, the processing unit 4 may classify the data G of fluctuation-factor information into any of a plurality of kinds and may execute different processing depending on each of classifications (any one of the above mentioned methods) or the numbers of repeating may be differentiated depending on each of classifications.

Further, any of plurality among the above (1) to (7) may be stored in the processing unit 4 and may be automatically selected, depending on user's selection or kinds of images. Otherwise, a plurality of these seven methods may be selected and alternately utilized or in series every one routine. Further, one method may be used during initial several repeating times and other method may be used thereafter. Here, the signal processing device 1 may include other method which is different from one of or a plurality of the above mentioned (1) to (7) methods.

Further, when allocating the difference data $\delta$, a part of the difference data $\delta$ is allocated to each pixel (each signal element) by using the allocation ratio k. But, instead, the difference data $\delta$ may be divided by the allocation ratio k which is under 1, namely the allocation ratio k may surpass 1, maximizing returned amount and greatly reducing the numbers of repeating the processing.

Further, as shown in FIG. 18, the present invention can be applied to other device more than an image processing device. FIG. 18 is a diagram for explaining the deployment of the processing method (the processing routine) executed by the processing unit 4 of the signal processing device 1 and the signal processing device 1 to a general signal processing device. In a linear system 21, when the data G of fluctuation-factor information such as blur in this system are already-known, output signals (output information) are the same, making input signals (input information) the same. Hence, the difference data $\delta$ between output signals (output information) as signal data and output signals as observation signals (output information) are fed back to input signals so as to make output signals (output information) as signal data the same. Then the processing shown in FIG. 3 and others are repeated until the time of making the difference data $\delta$ sufficiently small, attaining restoration of signal data before fluctuated such as blurred FIG. 18 explains a case when signal data such as sound are an object to be processed and the linear system 21 is a recorder in which the data G of fluctuation-factor information is known. In this case, the difference data δ between the original signal data Img' (output information) as observation signals and the comparison data Io+n' (Io') are fed back to the initial signal Io and the restored data Io+n$_{-1}$ so as to make the original signal data Img' be the same of the comparison data Io+n' (Io'). Then the processing shown in FIG. 3 and others are repeated until the time of making the difference data δ sufficiently small. Then, if the output signals (the original signal data Img') is the same or extremely close to the comparison data Io+n'(Io'), the restored data Io+n can be assumed to be the original signal data Img'.

FIG. 18 explains generalization of the present invention with exemplifying sound signals. But, any other devices, if the data G of fluctuation-factor information is applied to the already-known linear system 21 in such devices, can attain the restored data Io+n by repeating the processing in FIG. 3 and other figures and approximating the difference data δ to be "0". For example, the above generalization can be deployed to devices handling signals such as voice signal processing device and a device for detecting earthquake wave signals more than image signals.

Further, the above methods may be programmed. Further, such programmed content may be stored in a memory such as compact disc (CD), DVD, universal serial bus (USB) and read by a computer. In this case, the signal processing device 1 may include a means for reading the program stored in the medium. Further, the programmed content may be input to a server out of the signal processing device, down-loaded and used if it is necessary. In such case, the signal processing device 1 may include a communication means down-loading the program stored in a medium.

The invention claimed is:

1. A signal processing device comprising a processing unit that produces restored data approaching to unknown signal data before fluctuating by repeating the following processing,
   generating comparison data from arbitrary signal data by using information data regarding a fluctuation factor that triggers signal fluctuation;
   comparing the comparison data with original fluctuated signal data as an object to be processed;
   producing restored data by using data that shows the difference between the comparison data and the original fluctuated signal data; and
   substituting the restored data for the arbitrary signal data;
   wherein the producing restored data by using the difference data further comprises: adding the difference, which corresponds to a signal element, or variable power of the difference to a signal element corresponding to the comparison data.

2. The signal processing device according to claim 1, wherein the processing unit halts the repetition of processing if the difference data become equal to or less or smaller than a predetermined value.

3. The signal processing device according to claim 1, wherein the processing unit halts the repetition of processing if the number of the repetition become a predetermined number.

4. The signal processing device according to claim 1, wherein the processing unit halts the repetition of the processing if the difference data become equal to or less or smaller than a predetermined value at the time when the number of the repetition reaches a predetermined number, and performs further repetition by a predetermined number if the difference data become equal to or more than or exceed a predetermined value.

5. A signal processing device comprising a processing unit that performs the following processing,
   generating comparison data from predetermined signal data by using information data regarding a fluctuation factor that triggers signal fluctuation;
   comparing the comparison data with original fluctuated signal data that includes fluctuated signals as an object to be a processed;
   halting the processing and treating the predetermined signal data that have been base for the comparison data as unknown signals before fluctuation of original fluctuated signal data if difference data between the comparison data and the original fluctuated signal data are equal to or less or smaller than a predetermined value; and
   producing restored data by using the difference data, substituting the restored data for the predetermined signal data and repeating the processing if the difference data are equal to or more or larger than the predetermined value;
   wherein the producing restored data by using the difference data further comprises: adding the difference, which corresponds to a signal element, or variable power of the difference to a signal element corresponding to the comparison data.

6. The signal processing device according to claim 5, wherein the processing unit halts the repetition of the processing if the number of the repetition reaches a predetermined number.

7. The signal processing device according to claim 1, further comprising:
   a detection unit that detects information regarding a fluctuation factor; and
   a factor information storing unit that stores already-known information regarding a fluctuation factor.

8. The signal processing device according to claim 1, wherein the repetition of the processing is halted if the difference data get dispersed.

9. The signal processing device according to claim 1, wherein the repetition of the processing is halted if the stored data include an abnormal value except a permitted value.

10. The signal processing device according to claim 1, wherein, if the stored data includes an abnormal value except a permitted value, the repetition of the processing is continued after the abnormal value is replaced with a permitted value.

11. The signal processing device according to claim 1, wherein the producing restored data by using the difference data further comprises; allocating the difference data to the arbitrary signal data or predetermined signal data by using the information data regarding a fluctuation factor.

12. The signal processing device according to claim 11, wherein the processing unit sets a barycenter of the information regarding a fluctuation factor and add the difference data of a signal element at the barycenter or the variable power of the difference data to a signal element to be restored among arbitrary or predetermined signals.

13. The signal processing device according to claim 1, wherein the producing the restored data further comprises placing the data in a region to be a restored object that is positioned opposing to any one of vertical, horizontal and slanted directions if the restored data is yielded outside of the region to be a restored object.

14. The signal processing device according to claim 5, further comprising:
- a detection unit that detects information regarding a fluctuation factor; and
- a factor information storing unit that stores already-known information regarding a fluctuation factor.

15. The signal processing device according to claim 5, wherein the repetition of the processing is halted if the difference data get dispersed.

16. The signal processing device according to claim 5, wherein the repetition of the processing is halted if the stored data include an abnormal value except a permitted value.

17. The signal processing device according to claim 5, wherein, if the stored data includes an abnormal value except a permitted value, the repetition of the processing is continued after the abnormal value is replaced with a permitted value.

18. The signal processing device according to claim 5, wherein the producing restored data by using the difference data further comprises; allocating the difference data to the arbitrary signal data or predetermined signal data by using the information data regarding a fluctuation factor.

19. The signal processing device according to claim 5, wherein the producing the restored data further comprises placing the data in a region to be a restored object that is positioned opposing to any one of vertical, horizontal and slanted directions if the restored data is yielded outside of the region to be a restored object.

* * * * *